(12) United States Patent
Guo

(10) Patent No.: US 11,222,190 B2
(45) Date of Patent: Jan. 11, 2022

(54) FINGERPRINT IDENTIFICATION APPARATUS AND ELECTRONIC DEVICE

(71) Applicant: SHENZHEN GOODIX TECHNOLOGY CO., LTD., Shenzhen (CN)

(72) Inventor: Yiping Guo, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 32 days.

(21) Appl. No.: 16/821,869

(22) Filed: Mar. 17, 2020

(65) Prior Publication Data

US 2020/0218873 A1 Jul. 9, 2020

Related U.S. Application Data

(63) Continuation-in-part of application No. PCT/CN2018/125324, filed on Dec. 29, 2018.

(51) Int. Cl.
*G06K 9/00* (2006.01)

(52) U.S. Cl.
CPC ............................... *G06K 9/00013* (2013.01)

(58) Field of Classification Search
CPC .................................................. G06K 9/00013
See application file for complete search history.

(56) References Cited

U.S. PATENT DOCUMENTS

| | | | |
|---|---|---|---|
| 9,613,250 B2 | 4/2017 | Karame | |
| 2005/0179368 A1 | 8/2005 | Ryu et al. | |
| 2006/0035415 A1 | 2/2006 | Wood et al. | |
| 2006/0192230 A1 | 8/2006 | Wood et al. | |
| 2017/0316248 A1* | 11/2017 | He | G01L 1/142 |
| 2018/0101718 A1* | 4/2018 | Lowe | G06Q 20/34 |
| 2018/0306640 A1 | 10/2018 | Pang et al. | |
| 2018/0322326 A1* | 11/2018 | Li | G06K 9/00053 |
| 2019/0012517 A1 | 1/2019 | Li | |
| 2019/0057239 A1 | 2/2019 | Hou et al. | |
| 2019/0163953 A1* | 5/2019 | Jin | G06K 9/00046 |
| 2020/0218869 A1* | 7/2020 | Han | G06K 9/0002 |

FOREIGN PATENT DOCUMENTS

| | | |
|---|---|---|
| CN | 107223203 A | 9/2017 |
| CN | 107241468 A | 10/2017 |
| CN | 107451579 A | 12/2017 |

(Continued)

*Primary Examiner* — Utpal D Shah
(74) *Attorney, Agent, or Firm* — Scully Scott Murphy & Presser

(57) ABSTRACT

Provided are a fingerprint identification apparatus and an electronic device, and the fingerprint identification apparatus is applied to an electronic device having a display screen. The fingerprint identification apparatus comprises: a support plate used to fixedly connect with a middle frame of the electronic device; and at least one fingerprint sensor chip disposed on an upper surface of the support plate and disposed under the display screen through the support plate; wherein the at least one fingerprint sensor chip is configured to receive a fingerprint detecting signal returned by reflection or scattering via a human finger on the display screen, wherein the fingerprint detecting signal is used to detect fingerprint information of the finger.

20 Claims, 4 Drawing Sheets

(56) References Cited

FOREIGN PATENT DOCUMENTS

| | | | |
|---|---|---|---|
| CN | 107636686 | A | 1/2018 |
| CN | 107942563 | A | 4/2018 |
| CN | 108684207 | A | 10/2018 |
| CN | 109075141 | A | 12/2018 |
| CN | 208283964 | U | 12/2018 |
| EP | 1557891 | A2 | 7/2005 |
| EP | 3444746 | A1 | 2/2019 |

\* cited by examiner

FINGERPRINT IDENTIFICATION APPARATUS AND ELECTRONIC DEVICE

CROSS-REFERENCE TO RELATED APPLICATIONS

This application is a continuation-in-part of International Application No. PCT/CN2018/125324, filed on Dec. 29, 2018, the disclosure of which is hereby incorporated by reference in its entirety.

TECHNICAL FIELD

Embodiments of the present application relate to the technical field of fingerprint identification, and more particularly, to a fingerprint identification apparatus and an electronic device.

BACKGROUND

With rapid development of a terminal industry, a fingerprint identification technology has received more and more attention from people, and practical usage of a more convenient under-screen fingerprint identification technology has become a popular requirement.

At present, there are mainly two implementation manners for the under-screen fingerprint identification technology. One implementation manner is to attach an optical fingerprint identification module under an OLED display screen, and the procedure of the implementation manner is complicated and difficult, and it can easily damage the OLED display screen. The other implementation manner is to prepare a display screen and a fingerprint identification module together, this requires very high precision for the entire optical fingerprint identification module during mass production, and the general processing technology cannot meet actual needs.

Therefore, how to achieve an under-screen fingerprint identification technology with simple and convenient processes has become an urgent technical problem to be solved.

SUMMARY

Provided are a fingerprint identification apparatus and an electronic device, which could achieve under-screen fingerprint identification with simple and convenient processes.

In a first aspect, provided is a fingerprint identification apparatus that is applied to an electronic device having a display screen, where the fingerprint identification apparatus includes:

a support plate used to fixedly connect with a middle frame of the electronic device; and at least one fingerprint sensor chip disposed on an upper surface of the support plate and disposed under the display screen through the support plate;

where the at least one fingerprint sensor chip is configured to receive a fingerprint detecting signal returned by reflection or scattering via a human finger on the display screen, where the fingerprint detecting signal is used to detect fingerprint information of the finger.

In a possible implementation manner, the middle frame is provided with a light-transmitting opening, an inverted step structure is formed at an edge of the light-transmitting opening, and the upper surface of the support plate and a step surface of the inverted step structure are fixedly connected.

In a possible implementation manner, the at least one fingerprint sensor chip includes a plurality of optical fingerprint sensor chips, and the plurality of optical fingerprint sensor chips are arranged side by side on a surface of the support plate to be spliced into an optical fingerprint sensor chip component.

In a possible implementation manner, the support plate is a rigid stiffening plate, an area of the rigid stiffening plate is larger than an area of the optical fingerprint sensor chip component located above the rigid stiffening plate to form an edge connection portion at an edge of the rigid stiffening plate, and an upper surface of the edge connection portion and the step surface of the inverted step structure are fixedly connected by a double-sided adhesive.

In a possible implementation manner, a height of the inverted step structure is greater than a thickness of the rigid stiffening plate.

In a possible implementation manner, the light-transmitting opening is used to transmit the fingerprint detecting signal returned by the reflection or scattering via the human finger on the display screen to the at least one fingerprint sensor chip, and a size of the light-transmitting opening is smaller than a size of the support plate and larger than a size of the at least one fingerprint sensor chip.

In a possible implementation manner, the light-transmitting opening is provided in a middle region or a lower middle region of the middle frame so that a fingerprint detecting region of the at least one fingerprint sensor chip is located at a middle position or a lower middle position of a display region of the display screen.

In a possible implementation manner, the fingerprint identification apparatus further includes:

a flexible printed circuit FPC component fixedly connected to an edge position on one side of the upper surface of the support plate.

In a possible implementation manner, the FPC component includes an FPC and a plurality of capacitors disposed on the FPC, the middle frame is provided with a hole, and the plurality of capacitors are configured to be disposed in the hole.

In a possible implementation manner, the fingerprint identification apparatus further includes:

a filter fixedly connected to an upper surface of the at least one fingerprint sensor chip, where reflectance of a light incident face of the filter is lower than a first threshold.

In a possible implementation manner, the first threshold is 1%.

In a possible implementation manner, the reflectance of the light incident face of the filter is lower than the first threshold by performing optical inorganic coating film processing or applying an organic blackening layer on the light incident face of the filter.

In a possible implementation manner, the filter is fixedly connected to a non-sensing region of the at least one fingerprint sensor chip by means of dispensing.

In a possible implementation manner, there is an air gap between the filter and a sensing region of the at least one fingerprint sensor chip, or glue is filled between the filter and a sensing region of the at least one fingerprint sensor chip, where a refractive index of the glue is lower than a second threshold.

In a possible implementation manner, the second threshold is 1.3.

In a possible implementation manner, the fingerprint sensor chip and the FPC are connected by a gold wire, where an arc height or an encapsulation height of the gold wire is lower than or parallel to the light incident face of the filter.

In a possible implementation manner, the support plate is a rigid stiffening plate of a metal material, and a thickness of the rigid stiffening plate is between 0.15 mm and 0.30 mm, so that the rigid stiffening plate can be disposed in an accommodating space formed by the inverted step structure of the middle frame, and the middle frame around the inverted step structure still retains a certain thickness to support the fingerprint identification apparatus.

In a possible implementation manner, surface roughness of the rigid stiffening plate is greater than 0.25 μm. By configuring the surface roughness of the rigid stiffening plate, self-emitting light of an OLED display screen can be prevented from forming reflection in a cavity of the fingerprint identification apparatus, and the surface with a certain roughness may scatter an optical signal to achieve the purpose of extinction, thereby avoiding the influence of light reflection on imaging.

In a possible implementation manner, the fingerprint identification apparatus is configured to be disposed under a middle region or a lower middle region of the display screen of the electronic device.

The middle position or the lower middle region of the display screen is usually a holding position for a user, and by disposing the fingerprint identification apparatus at this position, it is convenient for holding by the user and enhances user experience.

In a possible implementation manner, the fingerprint identification apparatus is in contact with a lower surface of a light-emitting unit in the middle region or the lower middle region of the display screen of the electronic device; or the fingerprint identification apparatus is not in contact with a lower surface of a light-emitting unit in the middle region or the lower middle region of the display screen, and a distance between the upper surface of the fingerprint sensor chip and a lower surface of the display screen is less than a third threshold.

In a possible implementation manner, an upper surface of the FPC is fixedly connected to a lower surface of the middle frame.

It should be understood that the middle frame above the FPC is a middle frame after a thickness reduction process. Specifically, the thickness reduction process may be performed on a bottom of the middle frame so that the thickness remains unchanged after the FPC is accommodated at the bottom of the middle frame.

In a possible implementation manner, the rigid stiffening plate is a metal material.

In a possible implementation manner, the rigid stiffening plate is black, or may be other colors that do not reflect light, such as gun color. The rigid stiffening plate is set to be a color that does not reflect light, which could prevent an optical signal reflected from a surface of the rigid stiffening plate from entering the sensor chip to affect fingerprint detection performance.

In a possible implementation manner, the third threshold is 600 μm.

In a second aspect, provided is an electronic device including:
a display screen; and
the fingerprint identification apparatus in the first aspect or any one of possible implementation manners of the first aspect;
a middle frame fixedly connected with a support plate in the fingerprint identification apparatus, where the fingerprint identification apparatus is disposed under the display screen through the middle frame for under-screen fingerprint detection.

In a possible implementation manner, the middle frame is provided with a light-transmitting opening, an inverted step structure is formed at an edge of the light-transmitting opening, and an upper surface of the support plate and a step surface of the inverted step structure are fixedly connected.

In a possible implementation manner, the support plate is a rigid stiffening plate, an edge connection portion is formed at an edge of the rigid stiffening plate, and an upper surface of the edge connection portion and the step surface of the inverted step structure are fixedly connected by a double-sided adhesive.

In a possible implementation manner, a height of the inverted step structure is greater than a thickness of the rigid stiffening plate.

In a possible implementation manner, the light-transmitting opening is used to transmit a fingerprint detecting signal returned by reflection or scattering via a human finger on the display screen to at least one fingerprint sensor chip in the fingerprint identification apparatus, and a size of the light-transmitting opening is smaller than a size of the support plate and larger than a size of the at least one fingerprint sensor chip.

In a possible implementation manner, the light-transmitting opening is provided in a middle region or a lower middle region of the middle frame so that a fingerprint detecting region of at least one fingerprint sensor chip in the fingerprint identification apparatus is located at a middle position or a lower middle position of a display region of the display screen.

In a possible implementation manner, a position on the middle frame close to an FPC component in the fingerprint identification apparatus is provided with a hole that is used to set the FPC component in the hole.

In a possible implementation manner, the fingerprint identification apparatus is in contact with a lower surface of a light-emitting unit in a middle region or a lower middle region of the display screen of the electronic device; or the fingerprint identification apparatus is not in contact with a lower surface of a light-emitting unit in a middle region or a lower middle region of the display screen, and a distance between an upper surface of the fingerprint sensor chip and a lower surface of the display screen is less than a third threshold.

In a possible implementation manner, the third threshold is 600 μm.

Based on the foregoing technical solutions, by disposing the fingerprint sensor chip on the support plate which is further fixedly connected to the middle frame of the electronic device, rather than directly fixing the fingerprint sensor chip to the display screen or integrating the fingerprint identification apparatus with the display screen, moreover, because of the rigid structure of the support plate and the middle frame, various connection manners may be adopted for fixed connection between them, which is easy to be implemented and has lower requirements for a processing technology, therefore, a simpler and more convenient under-screen fingerprint identification scheme could be achieved.

DESCRIPTION OF EMBODIMENTS

The technical solutions in embodiments of the present application will be described hereinafter with reference to the accompanying drawings.

As a common application scenario, an optical fingerprint system provided in an embodiment of the present application may be applied to a smart phone, a tablet computer, and other mobile terminals having a display screen or other terminal devices. More specifically, in the foregoing terminal device, a fingerprint identification apparatus may be specifically an optical fingerprint apparatus, which may be disposed in a partial region or an entire region under a display screen, thereby forming an under-screen (Under-display) optical fingerprint system.

Figure 1A:
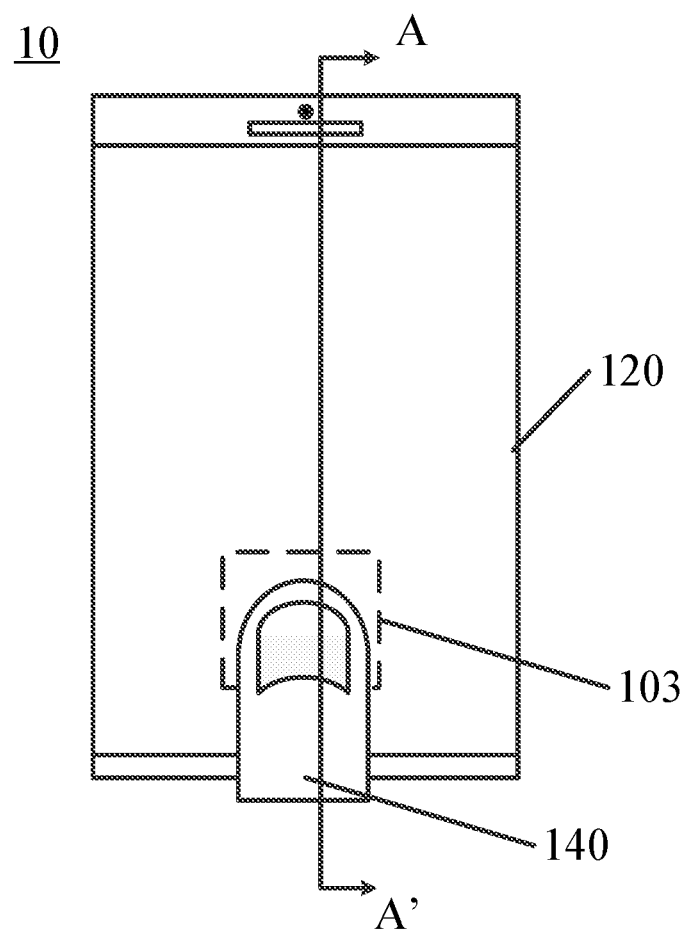
FIG. 1A is an oriented diagram of an electronic device according to an embodiment of the present application.
Figure 1B:
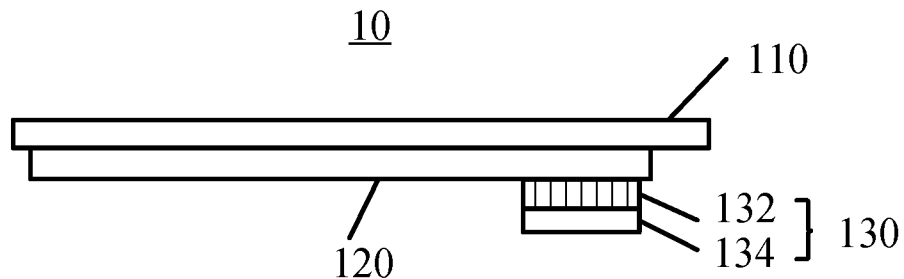
FIG. 1B is a partial schematic cross-sectional structural view of the electronic device shown in FIG. 1A taken along A-A'.

FIG. 1A and FIG. 1B are schematic views showing an electronic device to which an embodiment of the present application is applicable. FIG. 1A is a schematic front view of an electronic device 10, and FIG. 1B is a partial schematic cross-sectional structural view of the electronic device 10 shown in FIG. 1A taken along A-A'.

As shown in FIG. 1A and FIG. 1B, the electronic device 10 includes a display screen 120 and an optical fingerprint apparatus 130, where the optical fingerprint apparatus 130 is disposed in a partial region under the display screen 120, for example, under a middle region of the display screen. The optical fingerprint apparatus 130 includes an optical fingerprint sensor including a sensing array having a plurality of optical sensing units, and a region where the sensing array is located or its sensing region is a fingerprint detecting region 103 of the optical fingerprint apparatus 130. As shown in FIG. 1A, the fingerprint detecting region 103 is located in a display region of the display screen 120.

It should be understood that an area of the fingerprint detecting region 103 may be different from an area of the sensing array of the optical fingerprint apparatus 130. For example, the area of the fingerprint detecting region 103 of the optical fingerprint apparatus 130 may be larger than the area of the sensing array of the optical fingerprint apparatus 130 through for example, a lens imaging light path design, a reflective folding light path design or other light path designs such as light convergence or reflection. In other alternative implementation manners, if the light path is directed in a manner of, for example, light collimation, the area of the fingerprint detecting region 103 of the optical fingerprint apparatus 130 may also be designed to be substantially identical with the area of the sensing array 133 of the optical fingerprint apparatus 130.

Therefore, when a user needs to unlock the terminal device or perform other fingerprint verification, a fingerprint input may be implemented merely by pressing a finger on the fingerprint detecting region 103 located on the display screen 120. Since fingerprint detection may be implemented in the screen, there is no need to exclusively reserve space for a front surface of the electronic device 10 adopting the foregoing structure to set a fingerprint button (such as a Home button), so that a full screen solution may be adopted; that is, the display region of the display screen 120 may be substantially extended to the entire front surface of the electronic device 10.

As an alternative implementation manner, as shown in FIG. 1A, the optical fingerprint apparatus 130 includes a light detecting portion 134 and an optical component 132. The light detecting portion 134 includes the sensing array, a readout circuit and other auxiliary circuits electrically connected to the sensing array, and may be fabricated in a die (Die) by a semiconductor process such as an optical imaging chip or an optical fingerprint sensor. The sensing array is specifically a photo detector (Photo detector) array including a plurality of photo detectors distributed in an array, and the photo detectors may be used as the optical sensing units as described above. The optical component 132 may be disposed above the sensing array of the light detecting portion 134, and may specifically include a filter (Filter) layer, a light directing layer or a light path directing structure, and other optical elements, the filter layer may be used to filter out ambient light passing through a finger, such as infrared light interfering with imaging, and the light directing layer or light path directing structure is mainly used to direct reflected light reflected from a finger surface to the sensing array for optical detection.

In a specific implementation, the optical component 132 and the light detecting portion 134 may be encapsulated in the same optical fingerprint assembly. For example, the optical component 132 may be encapsulated with the optical detecting portion 134 in the same optical fingerprint chip, or the optical component 132 may be disposed outside the chip where the optical detecting portion 134 is located, for example, the optical component 132 is attached above the chip, or some elements of the optical component 132 are integrated into the chip.

The light directing layer or light path directing structure of the optical component 132 has various implementations, for example, the light directing layer may be specifically a collimator (Collimator) layer made of a semiconductor silicon wafer, which has a plurality of collimating units or micro-hole arrays, and the collimating units may be holes. Light among the reflected light reflected from the finger which is vertically incident to the collimating unit may pass through the hole and be received by the optical sensing unit below it. However, light with an excessive incident angle is attenuated through multiple reflections inside the collimating unit, therefore, each optical sensing unit may basically only receive the reflected light reflected from the fingerprint directly above the optical sensing unit, and thus the sensing array may detect a fingerprint image of the finger.

In another embodiment, the light directing layer or the light path directing structure may also specifically adopt a micro-lens (Micro-Lens) layer having a micro-lens array constituted by a plurality of micro-lenses, which may be formed above the sensing array of the light detecting portion 134 by a semiconductor growth process or other processes, and each micro-lens may correspond to one of the sensing units in the sensing array respectively. Furthermore, other optical film layers such as a medium layer or a passivation layer, may be formed between the micro-lens layer and the sensing unit, and more specifically, a light shielding layer having a micro-hole may also be formed between the micro-lens layer and the sensing unit, where the micro-hole is formed between the corresponding micro-lens and the sensing unit, and the light shielding layer may shield optical interference between adjacent micro-lenses and the sensing units, such that light corresponding to the sensing unit is converged to the interior of the micro-hole through the micro-lens and is transmitted to the sensing unit via the micro-hole for optical fingerprint imaging.

It should be understood that several implementations of the forgoing light path directing structure may be used alone or in combination, for example, a micro-lens layer may be further disposed under the collimator layer or the optical lens layer. Certainly, when the collimator layer or the optical lens layer is used in combination with the micro-lens layer, the specific laminated structure or light path may require to be adjusted according to actual needs.

As an optional embodiment, the display screen 120 may adopt a display screen having a self-emitting display unit, for example, an organic light-emitting diode (Organic Light-Emitting Diode, OLED) display screen or a micro light-emitting diode (Micro-LED) display screen. In an example of an OLED display screen, the optical fingerprint apparatus 130 may use a display unit (that is, an OLED light source) of the OLED display screen 120 located in the fingerprint detecting region 103 as an excitation light source for optical fingerprint detection. When a finger is pressed against the fingerprint detecting region 103, the display screen 120 emits a beam of light to the target finger above the fingerprint detecting region 103, and the light is reflected by a surface of the finger to form reflected light or form scattered light after scattering inside the finger. In related patent applications, the reflected light and the scattered light are collectively referred to as reflected light for convenience of description. Since a ridge (ridge) and a valley (valley) of a fingerprint have different light reflecting capabilities, reflected light from the ridge of the fingerprint and the reflected light from the valley of the fingerprint have different light intensities. After passing through the optical component, the reflected light is received by the sensing array in the optical fingerprint apparatus 130 and converted into a corresponding electrical signal, that is, a fingerprint detecting signal; and fingerprint image data may be obtained based on the fingerprint detecting signal, and fingerprint matching verification may be further performed, thereby implementing an optical fingerprint identification function at the electronic device 10. In other embodiments, the optical fingerprint apparatus 130 may also use an internal light source or an external light source to provide an optical signal for fingerprint detection.

It should be understood that, in a specific implementation, the electronic device 10 further includes a transparent protective cover; and the cover may be a glass cover or a sapphire cover, which is located above the display screen 120 and covers a front surface of the electronic device 10. Therefore, in an embodiment of the present application, the so-called finger being pressed against the display screen 120 actually refers to the finger being pressed against the cover above the display screen 120 or a surface of a protective layer covering the cover.

On the other hand, in some embodiments, the optical fingerprint apparatus 130 may only include one optical fingerprint sensor, and in this case, the fingerprint detecting region 103 of the optical fingerprint apparatus 130 has a smaller area and a fixed position, and therefore, when an fingerprint input is performed, the user needs to press the finger at a specific position of the fingerprint detecting region 103, otherwise the optical fingerprint apparatus 130 may not be able to capture the fingerprint image, thereby resulting in poor user experience. In other alternative embodiments, the optical fingerprint apparatus 130 may specifically include a plurality of optical fingerprint sensors which may be disposed in a middle region of the display screen 120 side by side in a splicing manner, and sensing regions of the plurality of optical fingerprint sensors collectively constitute the fingerprint detecting region 103 of the optical fingerprint apparatus 130. In other words, the fingerprint detecting region 103 of the optical fingerprint apparatus 130 may include a plurality of sub-regions, each sub-region corresponding to a sensing region of one of the optical fingerprint sensors, so that the fingerprint detecting region 103 of the optical fingerprint apparatus 130 may be extended to a main region of a middle portion of the display screen, that is, it is extended to a region generally pressed against by the finger, thereby achieving a blind pressing type of a fingerprint input operation. Alternatively, when the number of the optical fingerprint sensors is sufficient, the fingerprint detecting region 130 may also be extended to a half of the display region or even the entire display region, thereby achieving half-screen or full-screen fingerprint detection.

Limited by factors such as processing technology and precision requirements of a fingerprint module, the need for implementation of an under-screen fingerprint identification scheme with simple and convenient processes is becoming increasingly urgent. The present application provides an under-screen fingerprint identification scheme, in which a fingerprint identification apparatus may be mounted under a display screen in a simpler and more convenient manner, thereby implementing under-screen fingerprint identification that meets optical needs.

Figure 2:
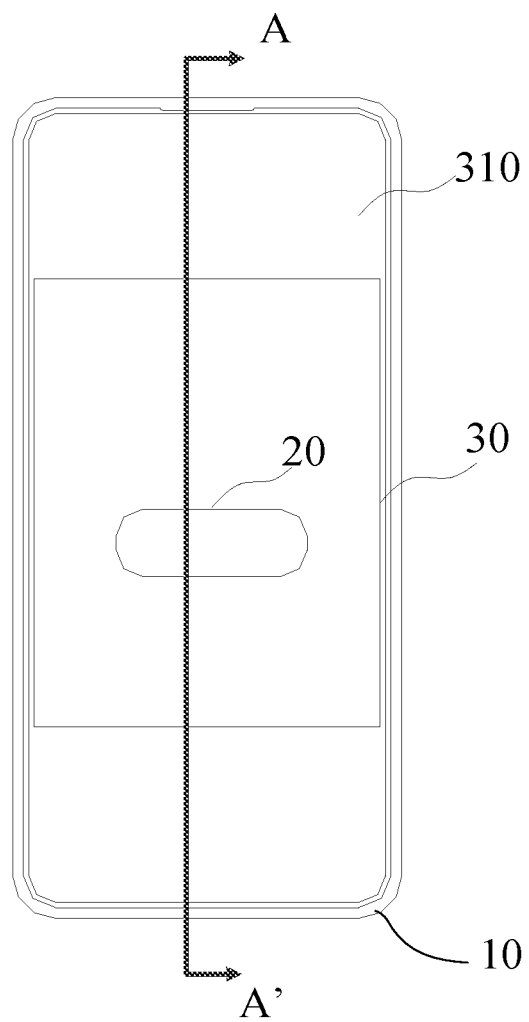
FIG. 2 is a schematic diagram of a typical mounting position of a fingerprint identification apparatus according to an embodiment of the present application.
Figure 3:
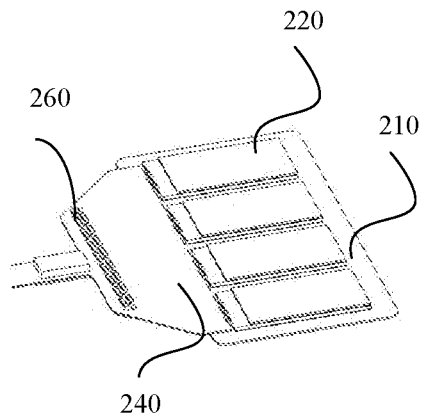
FIG. 3 is an oriented diagram of a fingerprint identification apparatus according to an embodiment of the present application.
Figure 4:
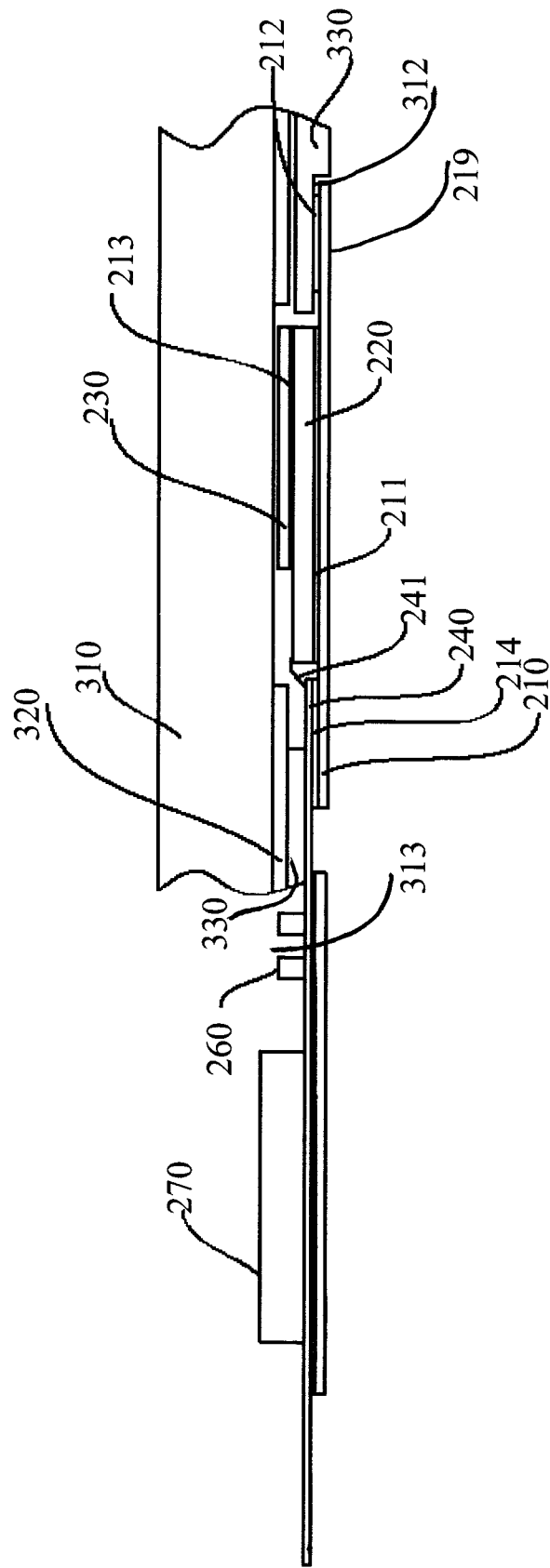
FIG. 4 is a partial schematic cross-sectional structural view of the electronic device shown in FIG. 2 taken along A-A'.

Hereinafter, a mounting manner of a fingerprint identification apparatus in an electronic device according to an embodiment of the present application will be described in detail with reference to FIG. 2 to FIG. 4. FIG. 2 is a schematic diagram of a typical mounting manner of a fingerprint identification apparatus 20 in an electronic device 10. FIG. 3 is an oriented view of a fingerprint identification apparatus 20. FIG. 4 is a partial schematic cross-sectional structural view of the electronic device shown in FIG. 2 taken along A'-A'. It should be noted that, in the embodiments of the present application, same reference numerals represent same components, and detailed description of the same components is omitted in different embodiments for the sake of brevity.

As shown in FIG. 2 to FIG. 4, the fingerprint identification apparatus 20 may be disposed under a display screen 310 of the electronic device 10. For example, the identification apparatus 20 may be disposed under a middle region or a lower middle region of the display screen 310, which is in line with use habits of a user and convenient for holding by the user. That is, the fingerprint identification apparatus 20 may be disposed under the display screen 310 of the electronic device 10 and above a battery 30.

It should be understood that, in the embodiment of the present application, the display screen 310 may be the display screen 120 shown in FIG. 1A or FIG. 1B. For related description, reference may be made to the foregoing description of the display screen 120, and no further details are provided herein for brevity.

In the embodiment of the present application, the fingerprint identification apparatus 20 is separated from the display screen 310. Specifically, the fingerprint identification apparatus 20 may be in contact with a lower surface of the display screen 310, or may not be in contact with the lower surface of the display screen 310. For example, a distance between the fingerprint identification apparatus and the lower surface of the display screen may be less than a specific threshold, such as 600 μm, so as to ensure that there are sufficient optical signals incident to a photosensitive region of a fingerprint sensor chip.

If the fingerprint identification apparatus 20 is not in contact with the lower surface of the display screen 310, a fixed gap is reserved therebetween, and the gap may be an air gap that is not filled with any auxiliary material, which could ensure that the fingerprint identification apparatus 20 would not touch the lower surface of the display screen 310 when the display screen 310 is pressed or the electronic device is dropped or collided, and stability and performance of biometric identification of the fingerprint identification apparatus 20 are not affected.

Optionally, in an embodiment of the present application, as shown in FIGS. 3 and 4, the fingerprint identification apparatus 20 may include:

a support plate 210 used to fixedly connect with a middle frame 330 of the electronic device; and at least one fingerprint sensor chip 220 disposed on an upper surface of the support plate 210 and disposed under the display screen 310 through the support plate 210;

where the at least one fingerprint sensor chip 220 is configured to receive a fingerprint detecting signal returned by reflection or scattering via a human finger on the display screen 310, where the fingerprint detecting signal is used to detect fingerprint information of the finger.

Optionally, in the embodiment of the present application, the support plate 210 may be various materials that are not easily deformed. For example, the support plate 210 may be a support plate of a metal material or a support plate of an alloy material, or may be a support plate of a plastic encapsulating material, as long as it has a definite shape and functions of support and fixation, which is not limited in the embodiment of the present application.

Therefore, in the embodiment of the present application, the fingerprint identification apparatus 20 may implement fixed connection with the middle frame 330 of the electronic device through the support plate 210 without being directly fixed to the display screen 310 or being integrated with the display screen 310. In addition, since the support plate 210 and the middle frame 330 are rigid structures, they may be fixedly connected in various methods, such as a double-sided adhesive fixing method, a glue fixing method, a welding and fixing method, a screw fixing method or a coupling and fixing method, which is easy to be implemented and has lower requirements for a processing technology.

In addition, in the embodiment of the present application, the fingerprint identification apparatus 20 is designed to be separated from the display screen 310, which could reduce difficulty of disassembling the fingerprint identification apparatus 20 when the fingerprint identification apparatus 20 is directly fixed to the display screen, and improve maintainability of the electronic device. Further, complexity of mounting the fingerprint identification apparatus 20 under the display screen 310 in a manufacturing process of the fingerprint identification apparatus could be reduced, a yield of the fingerprint identification apparatus could be improved, and further, production cost is reduced. Moreover, stability and performance of fingerprint identification of the fingerprint identification apparatus 20 are not affected either.

Optionally, in an embodiment of the present application, as shown in FIG. 4, the middle frame 330 is provided with a light-transmitting opening, an inverted step structure 312 is formed at an edge of the light-transmitting opening, and the upper surface of the support plate 210 and a step surface of the inverted step structure 312 are fixedly connected. That is, by fixedly connecting the upper surface of the support plate 210 and the step surface of the inverted step structure 312 of the middle frame 330, the fingerprint identification apparatus 20 may be implemented to be fixed on the middle frame 330 of the electronic device.

As an implementation manner, an accommodating space may be provided at the bottom of the middle frame 330 at an edge position of the light-transmitting opening, and the support plate 210 may be fixedly connected upwards to the accommodating space provided at the bottom of the middle frame from the bottom of the middle frame 330. For example, the upper surface of the support plate 210 is fixed to a top surface of the accommodating space. In a specific implementation, the support plate 210 attached with a double-sided adhesive may be assembled upwards from the position of the light-transmitting opening in the middle frame 330 so that the support plate 210 is connected to the top surface of the accommodating space at the bottom of the middle frame.

Optionally, in an embodiment of the present application, the light-transmitting opening is used to transmit the fingerprint detecting signal returned by the reflection or scattering via the human finger on the display screen to the at least one fingerprint sensor chip 220. In an implementation manner, a size of the light-transmitting opening may be set to be smaller than a size of the support plate 210 and larger than a size of the at least one fingerprint sensor chip 220 in the fingerprint identification apparatus, so that the at least one sensor chip 220 could be exposed from an upper surface of the middle frame 330 through the light-transmitting opening to receive the fingerprint detecting signal.

Optically, in the embodiment of the present application, the at least one fingerprint sensor chip 220 may be a single optical fingerprint sensor chip, or may include a plurality of optical fingerprint sensor chips, such as an optical fingerprint sensor chip array constituted by four optical fingerprint sensor chips shown in FIG. 3. When a plurality of optical fingerprint sensor chips are included, the plurality of optical fingerprint sensor chips may be arranged side by side under the middle region of the display screen 310 in a splicing manner to form an optical fingerprint sensor chip component, and sensing regions of the plurality of optical fingerprint sensors collectively constitute a fingerprint detecting region of the optical fingerprint apparatus 20.

Optionally, in an embodiment of the present application, the support plate 210 is a rigid stiffening plate, such as a rigid stiffening plate of a metal material. An area of the rigid stiffening plate is larger than an area of the optical fingerprint sensor chip component located above the rigid stiffening plate to form an edge connection portion 219 at an edge of the rigid stiffening plate, and an upper surface of the edge connection portion 219 and the step surface of the inverted step structure 312 are fixedly connected by a double-sided adhesive, or they may be fixedly connected in other connection methods described above, which is not limited in the embodiment of the present application. That is, the rigid stiffening plate may be fixedly connected to the middle frame through the edge connection portion 219 so that the entire fingerprint identification apparatus is fixed on the middle frame.

In an embodiment of the present application, where a lower surface of the edge connection portion and a lower surface of the middle frame are located on the same layer.

Optionally, in the embodiment of the present application, a height of the inverted step structure 312 (or an accommodating space) is greater than a thickness of the rigid stiffening plate, so that the rigid stiffening plate could be accommodated in the accommodating space formed by the inverted step structure 312.

Generally, a thickness of the middle frame is at least 0.35 mm, usually between 0.35 mm and 0.68 mm. Optionally, in an embodiment of the present application, the thickness of the rigid stiffening plate may be set between 0.15 mm and 0.30 mm, so that the rigid stiffening plate could be disposed in the accommodating space formed by the inverted step structure 312 of the middle frame 330, and the middle frame 330 at the inverted step structure 312 may still retain a certain thickness. That is, at the edge position of the light-transmitting opening, only part of the thickness of the middle frame is cut off to accommodate the rigid stiffening plate, and meanwhile the middle frame still retains a sufficient thickness to support the fingerprint identification apparatus 20.

Optionally, in an embodiment of the present application, surface roughness of the rigid stiffening plate is greater than 0.25 μm.

By configuring the surface roughness of the rigid stiffening plate to be greater than 0.25 μm, self-emitting light of an OLED display screen can be prevented from forming reflection in a cavity of the fingerprint identification apparatus, and the surface with a certain roughness may scatter an optical signal to achieve the purpose of extinction, thereby avoiding the influence of light reflection on imaging.

Optionally, in an embodiment of the present application, the rigid stiffening plate is black or other colors that do not reflect light, such as gun color. The rigid stiffening plate is set to be a color that does not reflect light, which could prevent an optical signal reflected from a surface of the rigid stiffening plate from entering the sensor chip to affect fingerprint detection performance.

As an optional embodiment, the light-transmitting opening is provided in a middle region or a lower middle region of the middle frame 330 so that the fingerprint detecting region of the at least one fingerprint sensor chip 220 is located at a middle position or a lower middle position of a display region of the display screen 310, which is convenient for holding by the user for fingerprint identification, thereby enhancing user experience.

Optionally, in an embodiment of the present application, as shown in FIG. 4, the fingerprint identification apparatus 20 further includes:

a filter 230 disposed on an upper surface of the at least one fingerprint sensor chip 220.

It should be understood that FIG. 4 is merely described by an example that the filter 230 is disposed on the upper surface of the at least one fingerprint sensor chip 220, but the present application is not limited thereto. For example, the filter 230 may be disposed inside the fingerprint sensor chip 220, for example, on a surface of an optical component.

Optionally, in an embodiment of the present application, reflectance of a light incident face of the filter 230 is lower than a first threshold, for example, 1%, so as to ensure that there are sufficient optical signals incident to the fingerprint sensor chip 220, thereby improving a fingerprint identification rate.

For example, optical inorganic coating film processing or an organic blackening layer may be performed or applied on the light incident face of the filter to reduce the reflectance of the light incident face of the filter.

Optionally, in an embodiment of the present application, in order to reduce the influence on light entering the fingerprint sensor chip 220, the filter 230 may be fixedly connected to a non-sensing region of the at least one fingerprint sensor chip 220 through a dispensing structure 213.

In addition, there is an air gap between the filter 230 and a sensing region of the fingerprint sensor chip 220, or a transparent material with a low refractive index is filled between the filter 230 and a sensing region of the fingerprint sensor chip 220, such as glue with a refractive index lower than 1.3.

In a specific implementation, the filter 230 may include one or more optical filters; the one or more optical filters can be configured, for example, as bandpass filters to allow transmission of light emitted by OLED pixels while shielding other light components such as IR light in the sunlight. These optical filters could be effective in reducing background light caused by the sunlight when the fingerprint identification apparatus is used outdoors. The one or more optical filters can be implemented as, for example, optical filter coatings formed on one or more continuous interfaces or one or more discrete interfaces. It should be understood that the filter 230 can be fabricated on a surface of any optical component or along an optical path to the sensor chip 220 from reflected light formed by reflection of a finger.

The filter 230 is used to reduce undesired background light in fingerprint sensing to improve optical sensing of received light by the fingerprint sensor chip 220. The filter 230 may be specifically used to reject the environment light wavelengths, such as near IR light and partial of the red light etc. For example, human fingers absorb most of energy of light at a wavelength below 580 nm, and if one or more optical filters or optical filtering layers are designed to reject light at a wavelength from 580 nm to infrared, undesired contributions to the optical detection in fingerprint sensing from the ambient light may be greatly reduced.

In the embodiment of the present application, the at least one fingerprint sensor chip 220 may receive reflected light reflected from the user finger and acquire a fingerprint detecting signal (such as a fingerprint image) based on the received optical signal, and the fingerprint detecting signal is used for fingerprint identification. In other words, the fingerprint sensor chip 220 first receives the reflected light reflected from the user finger and performs imaging based on the received optical signal to generate a fingerprint image; then, the fingerprint image is transmitted to an image processor so that the image processor performs image processing to obtain a fingerprint signal; and finally, fingerprint identification is performed on the fingerprint signal through an algorithm.

Optionally, in an embodiment of the present application, the fingerprint identification apparatus may further include a circuit board for transmitting a signal (such as the fingerprint detecting signal). For example, as shown in FIGS. 3 and 4, the circuit board may be a flexible circuit board (Flexible Printed Circuit, FPC) 240. Optionally, the FPC 240 may be fixedly connected at an edge position on one side of the upper surface of the support plate 210 by a double-sided adhesive 214.

In this case, the FPC 240 and the fingerprint sensor chip 220 may be arranged side by side on the upper surface of the support plate 210, in a specific implementation manner, the FPC 240 is fixed on the upper surface of the support plate near the inside, that is, the left side of the support plate shown in FIG. 4, and the fingerprint sensor chip is disposed on the upper surface of the support plate near the outside, that is, the right side of the support plate shown in FIG. 4.

In another embodiment of the present application, the flexible printed circuit FPC 240 is fixedly connected to the upper surface of the support plate 210 and is disposed below the fingerprint sensor chip 220, that is, the FPC 240 is disposed between the support plate 210 and the fingerprint sensor chip 220.

In a specific implementation manner, the FPC 240 extends to the end of the lower surface of the fingerprint sensor chip near the outside, that is, the right side of the fingerprint sensor chip 220 shown in FIG. 4.

In the embodiment of the present application, the fingerprint sensor chip 220 can be connected to the FPC 240 by a gold wire 241, and achieve electrical interconnection and signal transmission with other peripheral circuits or other elements in the electronic device as shown in FIG. 1 or FIG. 2 through the FPC 240. For example, the fingerprint sensor chip 220 may receive a control signal of a processing unit of the electronic device through the FPC 240, and may also output the fingerprint detecting signal (such as a fingerprint image) to the processing unit, a control unit or the like of the electronic device through the FPC 240.

Optionally, in an embodiment of the present application, an arc height or an encapsulation height of the gold wire 241 for connecting the FPC 240 to the fingerprint sensor chip 220 may be designed to be lower than or parallel to the light incident face of the filter 230, so as to prevent the gold wire 241 from increasing an encapsulation height (or a thickness) of the fingerprint identification apparatus.

Optionally, in an embodiment of the present application, the FPC 240 may further be provided with a plurality of capacitors 260, and the plurality of capacitors correspond to the at least one fingerprint sensor chip and are configured to perform filtering processing on the fingerprint detecting signal captured by the at least one fingerprint sensor chip 220.

Generally, a height of a capacitor is relatively high, and in order to provide an accommodating space for the capacitors 260, a hole may be provided at a position on the middle frame 330 that corresponds to the capacitors 260, for example, a hole 313, so that the capacitors 260 are exposed from the upper surface of the middle frame 330. Alternatively, an accommodating groove is provided at the bottom of the middle frame 330 so as to set the capacitors 260 in the accommodating groove. In this case, the capacitors may not be exposed from the upper surface of the middle frame 330.

Optionally, in an embodiment of the present application, as shown in FIG. 4, the fingerprint identification apparatus may further include an image processor 270, such as a microprocessor (Micro Processing Unit, MCU), for receiving a fingerprint detecting signal (e.g., a fingerprint image) sent from the FPC 240 and performing fingerprint identification based on the fingerprint detecting signal.

It should be understood that the position of the image processor 270 shown in FIGS. 3 and 4 is merely an example. The image processor 270 may also be disposed at another position in the fingerprint identification apparatus 20 as long as the connection with the sensor chip 220 can be implemented through the FPC 240.

As an optional embodiment, the at least one fingerprint sensor chip 220 may be connected to the rigid stiffening plate by means of bonding (Bonding). For example, the at least one fingerprint sensor chip 220 may be fixedly connected to the rigid stiffening plate by a chip fixing adhesive 211.

Optionally, in an embodiment of the present application, a display screen auxiliary layer 320 is disposed under the display screen 310, and the display screen auxiliary layer 320 includes, but is not limited to, a light shielding layer, a heat dissipation layer and a cushion layer, where the light shielding layer is used to shield other regions other than the fingerprint detecting region to prevent optical signals in the other regions from entering the sensor chip to affect the fingerprint detection effect, the heat dissipation layer may be used for heat dissipation of a light-emitting unit in the display screen, and the cushion layer may be used to cushion damage to the display screen when the electronic device is squeezed or collided.

For convenience of differentiation and description, the light-transmitting opening in the middle frame is denoted by a first light-transmitting opening, in an embodiment of the present application, the display screen auxiliary layer 320 comprises a second light-transmitting opening, the second light-transmitting opening corresponds to the first light-transmitting opening, the first light-transmitting opening and the second light-transmitting opening provide a receiving space, the receiving space can be used to receive the fingerprint sensor chip, in this case (denoted by case 1), the filter can be integrated into the chip, in other embodiment, the receiving space can be used to receive the fingerprint sensor chip and the filter, in this case (denoted by case 2), the filter can be connected to an upper surface of the at least one fingerprint sensor chip.

In the case 1, the distance between the upper surface of the support plate and the lower surface of the display screen is greater than the thickness of the fingerprint sensor chip.

In the case 2, the distance between the upper surface of the support plate and the lower surface of the display screen is greater than the thickness of the fingerprint sensor chip and a filter.

It should be noted that, in the embodiment of the present application, the middle frame 330 is a frame of an electronic device that is disposed between the display screen 310 and the battery 30 and is used for carrying various components therein, and the various components therein include, but are not limited to, a main board, a camera, a flex cable, various sensors, a microphone, an earphone, or the like.

Optionally, the middle frame 330 may be made of a metal or alloy material, or may be made of a plastic material, which is not limited in the embodiment of the present application.

It can be understood that the embodiment of the present application is described merely by an example that the fingerprint identification apparatus is fixed to the middle frame. In other alternative embodiments, the fingerprint identification apparatus 20 may implement that that fingerprint identification apparatus 20 is mounted under the display screen 310 by fixedly connecting to another structure of the electronic device that has a support function. Just ensure that the foregoing fingerprint identification apparatus 20 could be fixedly disposed under the display screen 310 in a separation manner. For example, the fingerprint identification apparatus 20 may be fixed to a structure or device of the electronic device that has a support function, such as a back cover, a main board or a battery, so as to be further fixedly disposed under the display screen 310.

An embodiment of the present application further provides an electronic device, and the electronic device may include a display screen; the fingerprint identification apparatus in the foregoing various embodiments of the present application; and a middle frame fixedly connected with a support plate in the fingerprint identification apparatus, where the fingerprint identification apparatus is disposed under the display screen through the middle frame for under-screen fingerprint detection.

It should be understood that the display screen may correspond to the display screen 310 in the foregoing embodiments. For related description, reference may be made to the foregoing description of the display screen 310, and no further details are provided herein for brevity.

It should also be understood that the middle frame may correspond to the middle frame 330 in the foregoing embodiments. For related description, reference may be made to the foregoing description of the middle frame 330, and no further details are provided herein for brevity.

Optionally, in an embodiment of the present application, the middle frame is provided with a light-transmitting opening, an inverted step structure is formed at an edge of the light-transmitting opening, and an upper surface of the support plate and a step surface of the inverted step structure are fixedly connected.

Optionally, in an embodiment of the present application, the support plate is a rigid stiffening plate, an edge connection portion is formed at an edge of the rigid stiffening plate, and an upper surface of the edge connection portion and the step surface of the inverted step structure are fixedly connected by a double-sided adhesive.

Optionally, in an embodiment of the present application, a height of the inverted step structure is greater than a thickness of the rigid stiffening plate.

Optionally, in an embodiment of the present application, the light-transmitting opening is used to transmit a fingerprint detecting signal returned by reflection or scattering via a human finger on the display screen to at least one fingerprint sensor chip in the fingerprint identification apparatus, and a size of the light-transmitting opening is smaller than a size of the support plate and larger than a size of the at least one fingerprint sensor chip.

Optionally, in an embodiment of the present application, the light-transmitting opening is provided in a middle region or a lower middle region of the middle frame so that a fingerprint detecting region of at least one fingerprint sensor chip in the fingerprint identification apparatus is located at a middle position or a lower middle position of a display region of the display screen.

Optionally, in an embodiment of the present application, a position on the middle frame close to an FPC component in the fingerprint identification apparatus is provided with a hole that is used to set the FPC component in the hole.

Optionally, in an embodiment of the present application, the fingerprint identification apparatus is in contact with a lower surface of a light-emitting unit in the middle region of the display screen of the electronic device; or the fingerprint identification apparatus is not in contact with a lower surface of a light-emitting unit in the middle region of the display screen, and a distance between the upper surface of the fingerprint sensor chip and a lower surface of the display screen is less than a third threshold.

Optionally, in an embodiment of the present application, the third threshold is 600 μm.

Optionally, in an embodiment of the present application, a display screen auxiliary layer is disposed under the display screen, where the display screen auxiliary layer may include a light shielding layer, a hear dissipation layer, a cushion layer and the like.

Optionally, in an embodiment of the present application, the display screen auxiliary layer comprises a second light-transmitting opening, the second light-transmitting opening corresponds to the first light-transmitting opening in the middle frame;

wherein the first light-transmitting opening and the second light-transmitting opening provide a receiving space for the fingerprint sensor chip; or the first light-transmitting opening and the second light-transmitting opening provide a receiving space for the fingerprint sensor chip and a filter, wherein the filter is connected to an upper surface of the at least one fingerprint sensor chip.

Figure 5:
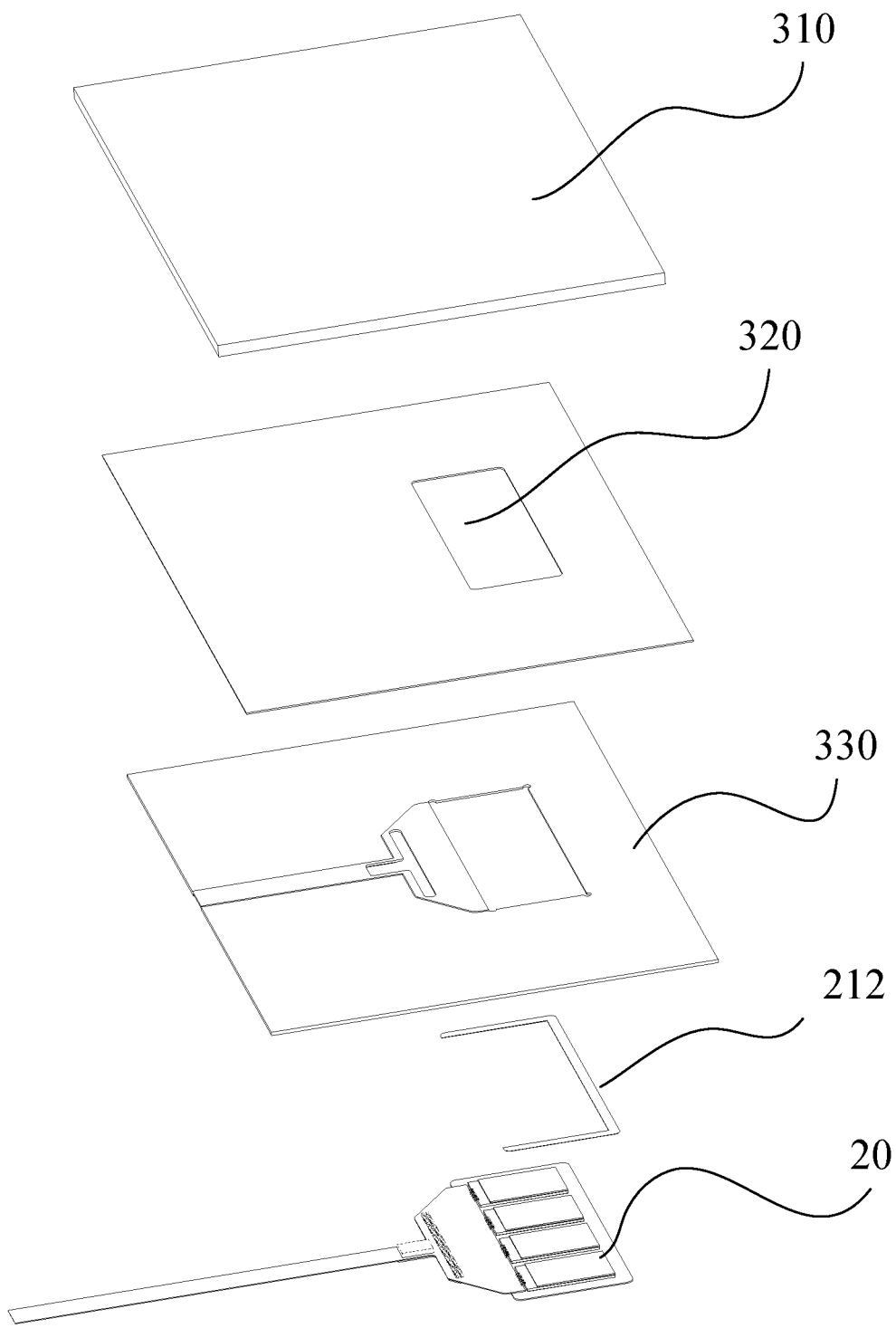
FIG. 5 is a schematic diagram of an assembly process of a fingerprint identification apparatus according to an embodiment of the present application.

An assembly process of a fingerprint identification apparatus will be exemplified below with reference to FIG. 5. It should be understood that this is merely an example and should not be construed as limitation on the embodiment of the present application.

The at least one fingerprint sensor chip, the FPC component, the filter and the like are attached to the support plate 210 layer by layer to obtain the fingerprint identification apparatus 20;

then, a double-sided adhesive 212 is pasted on an edge of the support plate 210; specifically, the double-sided adhesive 212 is pasted on three sides of the support plate that are far away from the FPC component; and next, a middle frame 330 is prepared, where the middle frame 330 is provided with various openings or open grooves for accommodating structural members of the fingerprint identification apparatus 20.

The fingerprint identification apparatus 20 attached with the double-sided adhesive 212 is assembled from a bottom of the middle frame 330 so that the edge of the support plate 210 is connected to a groove wall of the open groove at the bottom of the middle frame. For the specific connection effect, reference may be made to the sectional view shown in FIG. 4, which will not be repeatedly described here.

Further, a display screen auxiliary layer 320 and a display screen 310 may be sequentially disposed above the middle frame 330 so as to implement that the fingerprint identification apparatus is mounted under the display screen of the electronic device.

Therefore, according to the under-screen fingerprint assembly scheme of the embodiment of the present application, only a certain number and size of openings or open grooves need to be set in a middle frame according to a structure of a fingerprint identification apparatus, so that the fingerprint identification apparatus may be fixed to the middle frame through a support plate, and further the fingerprint identification apparatus is disposed under a display screen, thereby implementing under-screen optical fingerprint identification.

It should be understood that specific examples in embodiments of the present application are just for helping those skilled in the art better understand the embodiments of the present application, rather than for limiting the scope of the present application.

It should be understood that terms used in embodiments of the present application and the claims appended hereto are merely for the purpose of describing particular embodiments, and are not intended to limit the embodiments of the present application. For example, the use of a singular form of "a", "the above" and "said" in the embodiments of the present application and the claims appended hereto are also intended to include a plural form, unless otherwise clearly indicated herein by context.

Those of ordinary skill in the art may be aware that, units of the examples described in the embodiments disclosed in this paper may be implemented by electronic hardware, computer software, or a combination of the two. To clearly illustrate interchangeability between the hardware and the software, the foregoing illustration has generally described composition and steps of the examples according to functions. Whether these functions are performed by hardware or software depends on particular applications and designed constraint conditions of the technical solutions. Persons skilled in the art may use different methods to implement the described functions for each particular application, but it should not be considered that the implementation goes beyond the scope of the present application.

In the several embodiments provided in the present application, it should be understood that, the disclosed system and apparatus may be implemented in other manners. For example, the foregoing described apparatus embodiments are merely exemplary. For example, division of the units is merely logical function division and there may be other division manners in practical implementation. For example, multiple units or components may be combined or integrated into another system, or some features may be ignored or not executed. In addition, the displayed or discussed mutual coupling or direct coupling or communication connection may be indirect coupling or communication connection through some interfaces, apparatuses or units, and may also be electrical, mechanical, or connection in other forms.

The units described as separate components may or may not be physically separate, and components displayed as units may or may not be physical units, may be located in one position, or may be distributed on multiple network units. Part of or all of the units here may be selected according to a practical need to achieve the objectives of the solutions of the embodiments of the present application.

In addition, various functional units in the embodiments of the present application may be integrated into a processing unit, or each unit may exist alone physically, or two or more than two units may be integrated into one unit. The integrated unit may be implemented in a form of hardware, or may be implemented in a form of a software functional unit.

If the integrated unit is implemented in the form of the software functional unit and is sold or used as an independent product, it may be stored in a computer readable storage medium. Based on such understanding, the nature of the technical solutions of the present application, or the part contributing to the prior art, or all of or part of the technical solutions may be implemented in a form of software product. The computer software product is stored in a storage medium and includes several instructions for instructing a computer device (which may be a personal computer, a server, network equipment or the like) to execute all of or part of the steps of the methods described in the embodiments of the present application. The storage medium includes: various media that may store program codes, such as a U-disk, a removable hard disk, a read-only memory (ROM, Read-Only Memory), a random access memory (RAM, Random Access Memory), a magnetic disk, a compact disk, and so on.

The foregoing descriptions are merely specific implementations of the present application. The protection scope of the present application, however, is not limited thereto. Various equivalent modifications or replacements may be readily conceivable to any person skilled in the art within the technical scope disclosed in the present application, and such modifications or replacements shall fall within the protection scope of the present application. Therefore, the protection scope of the present application shall be subject to the protection scope of the claims.

What is claimed is:

1. A fingerprint identification apparatus applied to an electronic device having a display screen, wherein the fingerprint identification apparatus comprises:
   a support plate used to fixedly connect with a middle frame of the electronic device, the middle frame comprising a light-transmitting opening and an inverted step structure being formed at an edge thereof, an upper surface of the support plate and a step surface of the inverted step structure being fixedly connected, and the support plate being disposed in an accommodating space formed by the inverted step structure; and
   at least one fingerprint sensor chip disposed on an upper surface of the support plate and disposed under the display screen through the support plate;
   wherein the at least one fingerprint sensor chip is configured to receive a fingerprint detecting signal returned by reflection or scattering via a human finger on the display screen, wherein the fingerprint detecting signal is used to detect fingerprint information of the finger.

2. The fingerprint identification apparatus according to claim 1, wherein the support plate is a rigid stiffening plate comprising an edge connection portion at an edge thereof, and an upper surface of the edge connection portion and the step surface of the inverted step structure are fixedly connected.

3. The fingerprint identification apparatus according to claim 2, wherein a height of the inverted step structure is greater than a thickness of the rigid stiffening plate.

4. The fingerprint identification apparatus according to claim 2, wherein a bottom surface of the edge connection portion and a lower surface of the middle frame are located on the same layer.

5. The fingerprint identification apparatus according to claim 1, wherein the distance between the upper surface of the support plate and the lower surface of the display screen is greater than the thickness of the fingerprint sensor chip.

6. The fingerprint identification apparatus according to claim 5, wherein the fingerprint identification apparatus further comprises:
   a filter integrated into the fingerprint sensor chip.

7. The fingerprint identification apparatus according to claim 1, wherein the distance between the upper surface of the support plate and the lower surface of the display screen is greater than the thickness of the fingerprint sensor chip and a filter, wherein the filter is connected to an upper surface of the at least one fingerprint sensor chip.

8. The fingerprint identification apparatus according to claim 1, wherein the fingerprint identification apparatus further comprises:
   a flexible printed circuit FPC component fixedly connected to an edge position on one side of the upper surface of the support plate.

9. The fingerprint identification apparatus according to claim 8, wherein the FPC component and the fingerprint sensor chip are arranged side by side on the upper surface of the support plate, wherein the FPC component is fixed on the upper surface of the support plate near an inside, and the fingerprint sensor chip is disposed on the upper surface of the support plate near the outside.

10. The fingerprint identification apparatus according to claim 8, wherein the flexible printed circuit FPC component is fixedly connected to the upper surface of the support plate near an outside and is disposed below the fingerprint sensor chip.

11. The fingerprint identification apparatus according to claim 10, wherein the FPC component extends to the end of the lower surface of the fingerprint sensor chip near the outside.

12. The fingerprint identification apparatus according to claim 8, wherein the FPC component comprises an FPC and a plurality of capacitors disposed on the FPC, the middle frame is provided with a hole, and the plurality of capacitors are configured to be disposed in the hole.

13. The fingerprint identification apparatus according to claim 12, wherein the fingerprint sensor chip and the FPC are connected by a gold wire, wherein an arc height or an encapsulation height of the gold wire is lower than or parallel to the light incident face of a filter, wherein the filter is disposed on the upper surface of the at least one fingerprint sensor chip.

14. The fingerprint identification apparatus according to claim 1, wherein the light-transmitting opening is used to transmit the fingerprint detecting signal returned by the reflection or scattering via the human finger on the display screen to the at least one fingerprint sensor chip, and a size of the light-transmitting opening is smaller than a size of the support plate and larger than a size of the at least one fingerprint sensor chip.

15. The fingerprint identification apparatus according to claim 1, wherein the support plate is a rigid stiffening plate of a metal material, and a thickness of the rigid stiffening plate is between 0.15 mm and 0.30 mm.

16. The fingerprint identification apparatus according to claim 15, wherein surface roughness of the rigid stiffening plate is greater than 0.25 µm.

17. The fingerprint identification apparatus according to claim 1, wherein the at least one fingerprint sensor chip comprises a plurality of optical fingerprint sensor chips, and the plurality of optical fingerprint sensor chips are arranged side by side on a surface of the support plate to be spliced into an optical fingerprint sensor chip component.

18. An electronic device comprising:
a display screen;
a fingerprint identification apparatus comprising a support plate used to fixedly connect with a middle frame of the electronic device, the middle frame comprising a first light-transmitting opening and an inverted step structure being formed at an edge thereof, a upper surface of the support plate and a step surface of the inverted step structure being fixedly connected, and the support plate being disposed in an accommodating space formed by the inverted step structure; and at least one fingerprint sensor chip disposed on an upper surface of the support plate and disposed under the display screen through the support plate; wherein the at least one fingerprint sensor chip is configured to receive a fingerprint detecting signal returned by reflection or scattering via a human finger on the display screen, wherein the fingerprint detecting signal is used to detect fingerprint information of the finger; and
a middle frame fixedly connected with a support plate in the fingerprint identification apparatus, wherein the fingerprint identification apparatus is disposed under the display screen through the middle frame for under-screen fingerprint detection.

19. The electronic device according to claim 18, wherein the electronic device further comprises:
a display screen auxiliary layer disposed under the display screen, comprising a second light-transmitting opening, the second light-transmitting opening corresponds to the first light-transmitting opening;
wherein the first light-transmitting opening and the second light-transmitting opening provide a receiving space for the fingerprint sensor chip; or
the first light-transmitting opening and the second light-transmitting opening provide a receiving space for the fingerprint sensor chip and a filter, wherein the filter is connected to an upper surface of the at least one fingerprint sensor chip.

20. The electronic device according to claim 18, wherein the light-transmitting opening is used to transmit a fingerprint detecting signal returned by reflection or scattering via a human finger on the display screen to at least one fingerprint sensor chip in the fingerprint identification apparatus, and a size of the light-transmitting opening is smaller than a size of the support plate and larger than a size of the at least one fingerprint sensor chip.

* * * * *